United States Patent
Naim et al.

(10) Patent No.: US 9,137,716 B1
(45) Date of Patent: Sep. 15, 2015

(54) MOBILITY BASED FREQUENCY BAND SELECTION IN WIRELESS COMMUNICATION SYSTEMS

(71) Applicant: Sprint Communications Company L.P., Overland Park, KS (US)

(72) Inventors: Muhammad Ahsan Naim, Sterling, VA (US); Yu Zhou, Herndon, VA (US); Aik Chindapol, Washington, DC (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/142,142

(22) Filed: Dec. 27, 2013

(51) Int. Cl.
*H04W 36/00* (2009.01)
(52) U.S. Cl.
CPC .................. *H04W 36/0072* (2013.01)
(58) Field of Classification Search
USPC .................................................. 455/436–448
See application file for complete search history.

(56) References Cited

U.S. PATENT DOCUMENTS

| | | | |
|---|---|---|---|
| 5,329,635 A | 7/1994 | Wadin et al. | |
| 5,436,956 A | 7/1995 | Shiotsuki et al. | |
| 5,450,473 A | 9/1995 | Shiotsuki et al. | |
| 5,548,808 A | 8/1996 | Bruckert et al. | |
| 5,579,373 A | 11/1996 | Jang | |
| 5,924,043 A | 7/1999 | Takano | |
| 6,073,025 A | 6/2000 | Chheda et al. | |
| 6,456,827 B1 | 9/2002 | Kubo et al. | |
| 6,487,409 B2 | 11/2002 | Qing-An | |
| 6,507,740 B2 | 1/2003 | Shi | |
| 6,714,789 B1 | 3/2004 | Oh et al. | |
| 6,745,034 B2 | 6/2004 | Wang et al. | |
| 6,832,086 B1 * | 12/2004 | Powers et al. | 455/423 |
| 6,907,243 B1 | 6/2005 | Patel | |
| 7,076,245 B1 | 7/2006 | Satapathy | |
| 7,089,007 B2 | 8/2006 | Wakuta et al. | |
| 7,092,722 B1 | 8/2006 | Oh et al. | |
| 7,200,127 B1 | 4/2007 | Lee et al. | |
| 7,206,579 B2 | 4/2007 | Gwon et al. | |

(Continued)

FOREIGN PATENT DOCUMENTS

EP        2385725        11/2011

OTHER PUBLICATIONS

U.S. Appl. No. 14/015,973, filed Aug. 30, 2013.

(Continued)

*Primary Examiner* — Joel Ajayi

(57) ABSTRACT

Systems, methods, and software for selecting frequency bands in wireless communication networks are provided herein. In one example, a method of operating a wireless communication system is provided. The method includes, in the wireless communication device, exchanging wireless communications with the wireless network over the throughput frequency band, tracking mobility status of the wireless communication device to determine if the mobility status satisfies a mobility condition, and responsively transferring a mobility mode indication to the wireless network. The method also includes, in the wireless network, receiving the mobility mode indication and transitioning the wireless communication device to the mobility frequency band from the throughput frequency band. The method also includes, in the wireless communication device, responsive to transitioning from the throughput frequency band to the mobility frequency band, exchanging wireless communications with the wireless network over the mobility frequency band.

8 Claims, 6 Drawing Sheets

(56) References Cited

U.S. PATENT DOCUMENTS

| | | |
|---|---|---|
| 7,302,266 B1 | 11/2007 | Sill et al. |
| 7,313,113 B1 | 12/2007 | Hills et al. |
| 7,693,518 B2 | 4/2010 | Miyata |
| 7,738,874 B1 | 6/2010 | Sill et al. |
| 8,547,939 B1 | 10/2013 | Vargantwar |
| 2002/0102977 A1 | 8/2002 | Shi |
| 2002/0147014 A1* | 10/2002 | Atarius et al. ............... 455/436 |
| 2003/0119508 A1 | 6/2003 | Gwon et al. |
| 2005/0221828 A1 | 10/2005 | Wakuta et al. |
| 2006/0109820 A1 | 5/2006 | Miyata |
| 2008/0070576 A1 | 3/2008 | Sanders et al. |
| 2008/0108367 A1* | 5/2008 | Afrashteh et al. ......... 455/452.2 |
| 2008/0233958 A1 | 9/2008 | Robbins et al. |
| 2010/0056157 A1 | 3/2010 | Verona et al. |
| 2011/0045833 A1 | 2/2011 | Kazmi |
| 2013/0040692 A1 | 2/2013 | Chen et al. |

OTHER PUBLICATIONS

U.S. Appl. No. 14/089,891, filed Nov. 26, 2013.
U.S. Appl. No. 13/448,451, filed Apr. 17, 2012.
U.S. Appl. No. 13/070,607, filed Mar. 24, 2011.

* cited by examiner

MOBILITY BASED FREQUENCY BAND SELECTION IN WIRELESS COMMUNICATION SYSTEMS

TECHNICAL FIELD

Aspects of the disclosure are related to the field of communications, and in particular, wireless communication devices operating in wireless communication networks.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication access frequency band can be employed across a similar geographic region. The access frequency bands can be related to a similar wireless communication protocol. For example, a fourth generation (4G) Long Term Evolution (LTE) wireless network can provide wireless access to communication services over one or more access frequency bands. Wireless communication devices can be configured to support multiple wireless access frequency bands, such as communicating over one or more wireless frequency bands using one or more communication transceivers and associated equipment. In certain wireless communication protocols, such as LTE, the wireless communication devices themselves cannot select frequency bands while in a connected mode, and instead must rely upon network-side equipment. However, selecting an improper access frequency band to use can be lead to poor performance for wireless communication devices.

OVERVIEW

Systems, methods, and software for selecting frequency bands in wireless communication networks are provided herein. In one example, a method of operating a wireless communication system comprising at least one wireless communication device and a wireless network having at least a mobility frequency band and a throughput frequency band is provided. The method includes, in the wireless communication device, exchanging wireless communications with the wireless network over the throughput frequency band, tracking mobility status of the wireless communication device to determine if the mobility status satisfies a mobility condition, and responsive to determining the mobility status satisfies the mobility condition, transferring a mobility mode indication to the wireless network. The method also includes, in the wireless network, receiving the mobility mode indication and transitioning the wireless communication device to the mobility frequency band from the throughput frequency band. The method also includes, in the wireless communication device, responsive to transitioning from the throughput frequency band to the mobility frequency band, exchanging wireless communications with the wireless network over the mobility frequency band.

In another example, a wireless communication system is provided. The wireless communication system includes at least one wireless communication device and a wireless network having at least a mobility frequency band and a throughput frequency band. The wireless communication device is configured to exchange wireless communications with the wireless network over the throughput frequency band, track mobility status of the wireless communication device to determine if the mobility status satisfies a mobility condition, and, responsive to determining the mobility status satisfies the mobility condition, transfer a mobility mode indication to the wireless network. The wireless network is configured to receive the mobility mode indication and transition the wireless communication device to the mobility frequency band from the throughput frequency band. Responsive to transitioning from the throughput frequency band to the mobility frequency band, the wireless communication device is configured to exchange wireless communications with the wireless network over the mobility frequency band.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
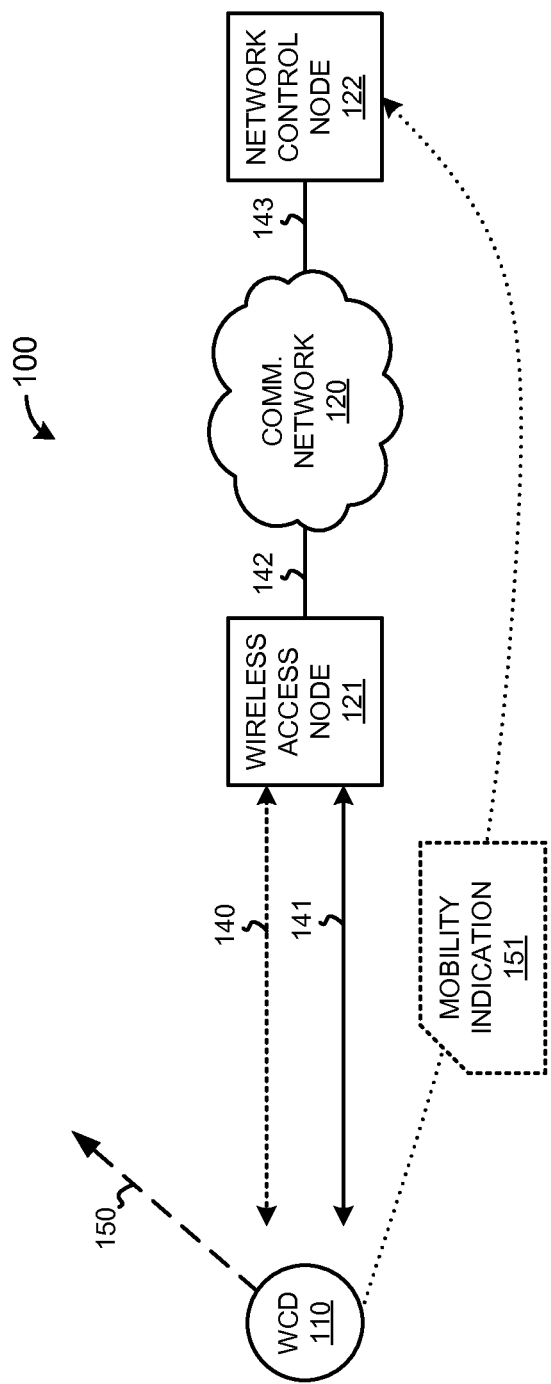
FIG. 1 is a system diagram illustrating a communication system.

FIG. 1 is a system diagram illustrating communication system 100. Communication system 100 includes wireless communication device (WCD) 110, wireless access node 121, communication network 120, and network control node 122. WCD 110 can communicate over any of wireless links 140-141 with wireless access node 121, and receive wireless access to communication services over any of links 140-141. Wireless access node 121 and communication network 120 communicate over link 142. Communication network 120 and network control node 122 communicate over link 143.

In operation, WCD 110 receives wireless access to communication services from wireless access node 121. These communication services can include any of voice services, data services, text messaging services, or other services provided by a cellular voice and data network, among other networks. WCD 110 is a mobile communication device in this example, and can move as indicated by movement 150.

Although one wireless access node is shown in FIG. 1, it should be understood that a plurality of wireless access nodes can be included and associated with communication network 120 to provide wireless access to communication services over a geographic area. WCD 110 can move throughout coverage areas of various wireless access nodes, and the operation with one wireless access node 121 will be discussed in this example.

Figure 2:
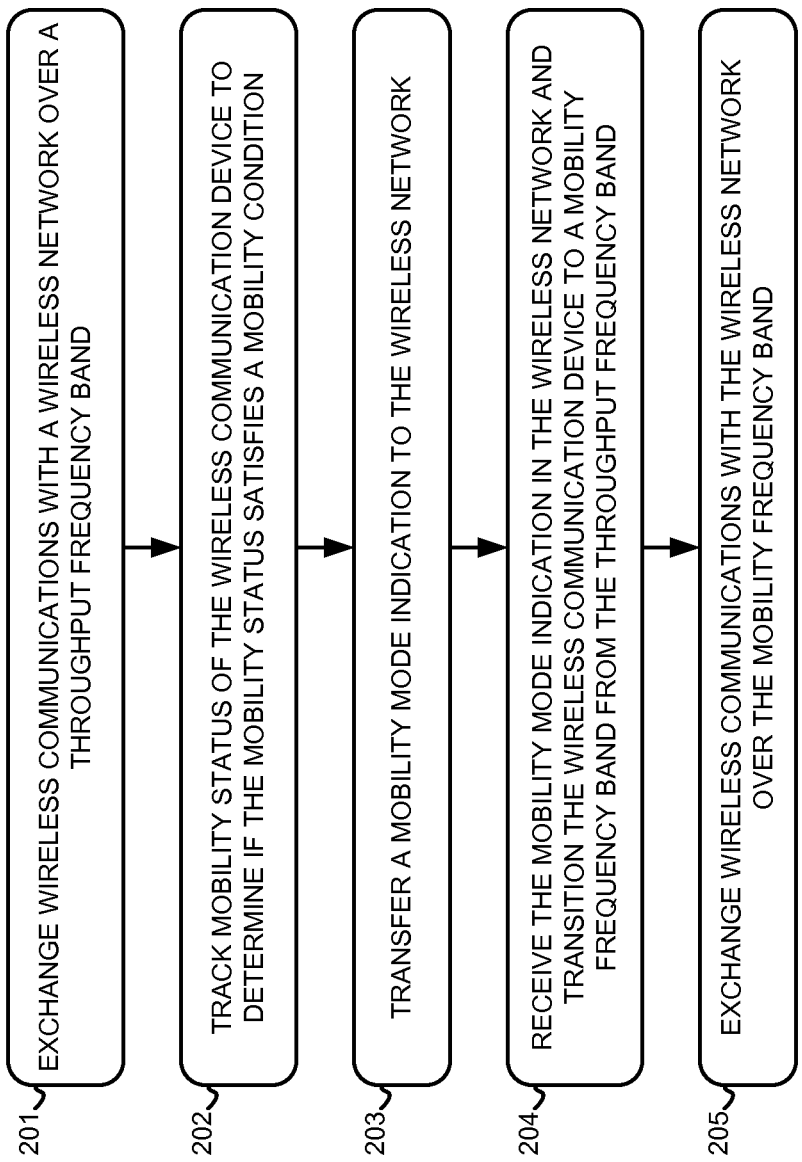
FIG. 2 is a flow diagram illustrating a method of operation of a communication system.

FIG. 2 is a flow diagram illustrating a method of operating communication system 100. The operations of FIG. 2 are referenced below parenthetically. In FIG. 2, WCD 110 exchange (201) wireless communications with a wireless network over a throughput frequency band. In this example, the wireless network includes at least elements of wireless access node 121, communication network 120, and network control node 122. The throughput frequency band is represented by wireless link 140 in FIG. 1. Wireless access node 121 can provide wireless access over at least wireless link 140 using the throughput frequency band and wireless link 141 using a mobility frequency band. In many examples, the throughput frequency band is a higher frequency band than the mobility frequency band. Wireless access node 121 can provide wireless access over further wireless links, such as mixed-use frequency bands and further throughput frequency bands or mobility frequency bands.

WCD 110 tracks (202) a mobility status of WCD 110 to determine if the mobility status satisfies a mobility condition. In FIG. 1, the mobility status of WCD 110 is indicated in part by movement 150. In some examples, movement 150 of WCD 110 can progress through coverage areas of many different wireless access nodes, not shown in FIG. 1 for clarity. Movement 150 can be tracked by WCD 110 in some instances by monitoring geographic location changes of WCD 110 using geographic location determination equipment including global positioning system (GPS) equipment. Movement 150 can be tracked by WCD 110 by monitoring a quantity of handoffs of WCD 110 over a predetermined period of time, where the handoffs are between different wireless access nodes while WCD 110 receives wireless access over the throughput frequency band. This movement can be the mobility status of WCD 110, along with other mobility factors. These other mobility factors can include user selections of mobility modes, times of day, correspondence of WCD 110 to certain roads, freeways, or other transportation corridors, among other mobility factors. The predetermined period of time can vary, such as a number of minutes, hours, or days.

The mobility status can satisfy the mobility condition in various ways. In some examples, the mobility condition comprises a threshold quantity of handoffs within a predetermined period of time. When the mobility status indicates the quantity of handoffs exceeds the threshold number of handoffs, then the mobility condition can be satisfied. In other examples, the mobility condition comprises a user selecting a mobility mode on WCD 110, and when the user selects the mobility mode, then the mobility condition can be satisfied. In yet further examples, when the mobility condition comprises a speed of WCD 110 or a distance covered in a predetermined time by WCD 110, then when these conditions are met, the mobility condition can be satisfied.

Responsive to the mobility condition being satisfied, WCD 110 transfers (203) a mobility mode indication to the wireless network. The mobility indication can be transferred for delivery to any of wireless access node 121, communication network 120, or network control node 122, as indicated by mobility indication 151 in FIG. 1. For example, WCD 110 can transfer mobility indication 151 for delivery to network control node 122. Mobility indication 151 indicates WCD 110 satisfies the mobility condition and that WCD 110 desires to transition from the throughput frequency band to the mobility frequency band.

Mobility indication 151 can indicate a selection of bearer or resource bearer by WCD 110. This bearer can correspond to a mobility bearer and indicates to the wireless network that WCD 110 desires to transition to receive wireless access using a mobility mode. In some example wireless networks, such as LTE, wireless communication devices cannot select a frequency band to receive wireless access, but instead can select a bearer. Thus, mobility indication 151 can indicate a selected bearer. The bearer can be a dedicated bearer which provides a connection between WCD 110 and elements of the wireless network. WCD 110 can select among a predetermined list of bearers provided by the wireless network and cached by WCD 110. The bearer selected by WCD 110 in this example can be designated as a mobility bearer by the wireless network.

Network control node 122 receives (204) the mobility mode indication in the wireless network and transitions the wireless communication device to a mobility frequency band from the throughput frequency band. In this example, mobility indication 151 is received by network control node 122 over communication network 120. Network control node processes mobility indication 151, such as identifying that WCD 110 desires to be transitioned from a throughput mode to a mobility mode, and responsively transitions WCD 110 from the throughput frequency band to the mobility frequency band. This transition can include instructing WCD 110 to hand off from wireless link 140 to wireless link 141, where wireless link 140 is associated with the throughput frequency band and wireless link 141 is associated with the mobility frequency band.

WCD 110 exchanges (205) wireless communications with the wireless network over the mobility frequency band. Once transitioned from the throughput frequency band to the mobility frequency band, WCD 110 can receive wireless access to communication services over the mobility frequency band. In this example, the mobility frequency band is wireless link 141. Although the same wireless access node 121 is shown as providing both the throughput frequency band the mobility frequency band, it should be understood that more than one wireless access node can be employed. After communicating over the mobility frequency band, a similar process as described above can be performed to transition WCD 110 back the throughput frequency band, such as when mobility decreases or when a desired data rate increases for WCD 110. Further frequency bands can be employed as well, such as mixed-use frequency bands.

Figure 3:
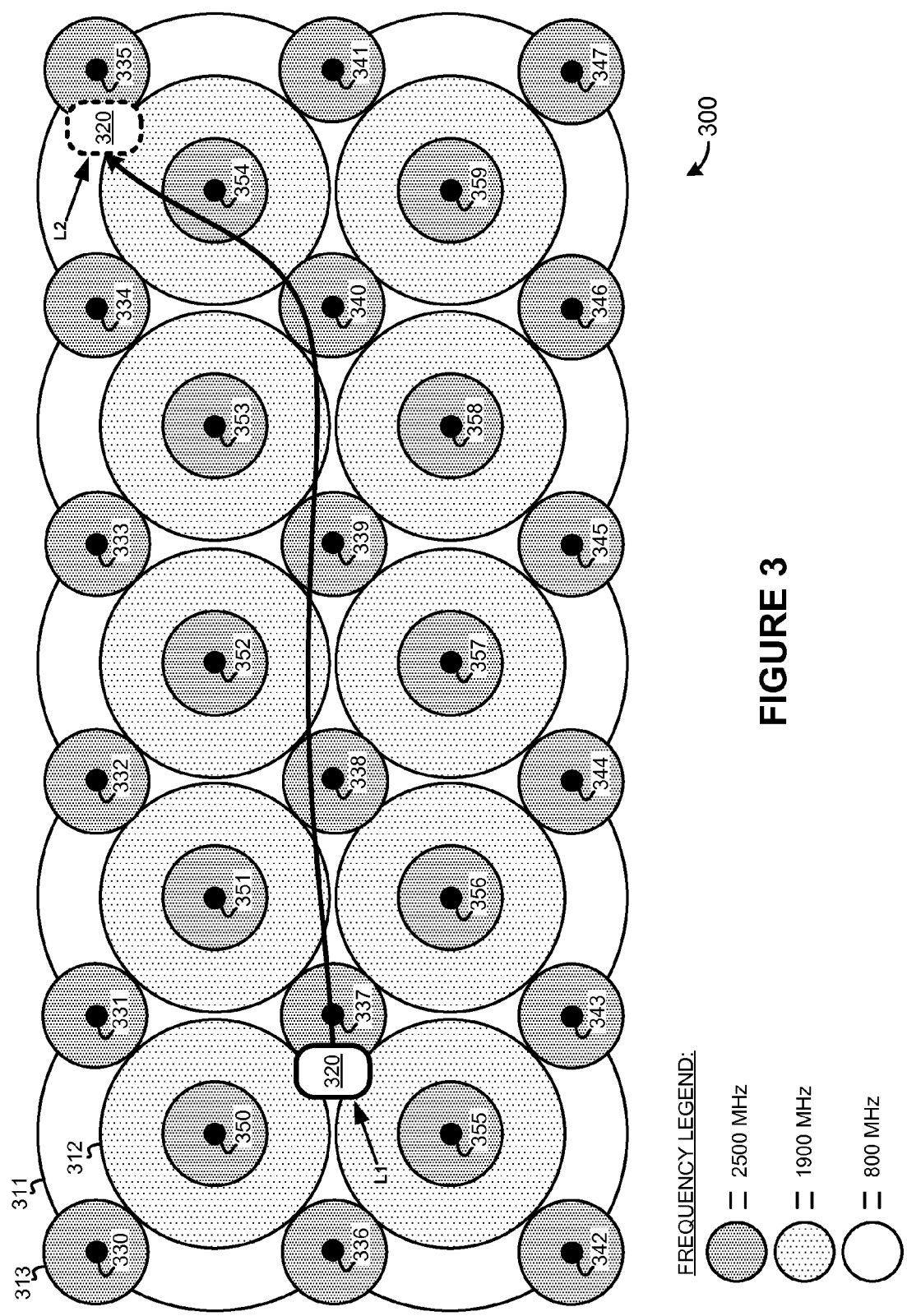
FIG. 3 is a system diagram illustrating a communication system.

FIG. 3 is a system diagram illustrating communication system 300. Communication system 300 includes mobile smartphone 320 and a plurality of wireless access nodes 330-347 and 350-359. Communication system 300 can represent a distribution of wireless access nodes over a geographic area, such as a city or metropolitan area. Although further equipment is not shown in FIG. 3 for clarity, it should be understood that wireless links, backhaul links, routers, switches, gateways, networks, and the like, could be included. Smartphone 320 comprises a mobile wireless communication device with one or more transceivers and antennas for communicating over one or more frequency bands or frequency spectrums. Each wireless access node 330-347 and 350-359 can comprise base stations, eNodeB equipment, base transceiver stations, and the like.

Figure 4:
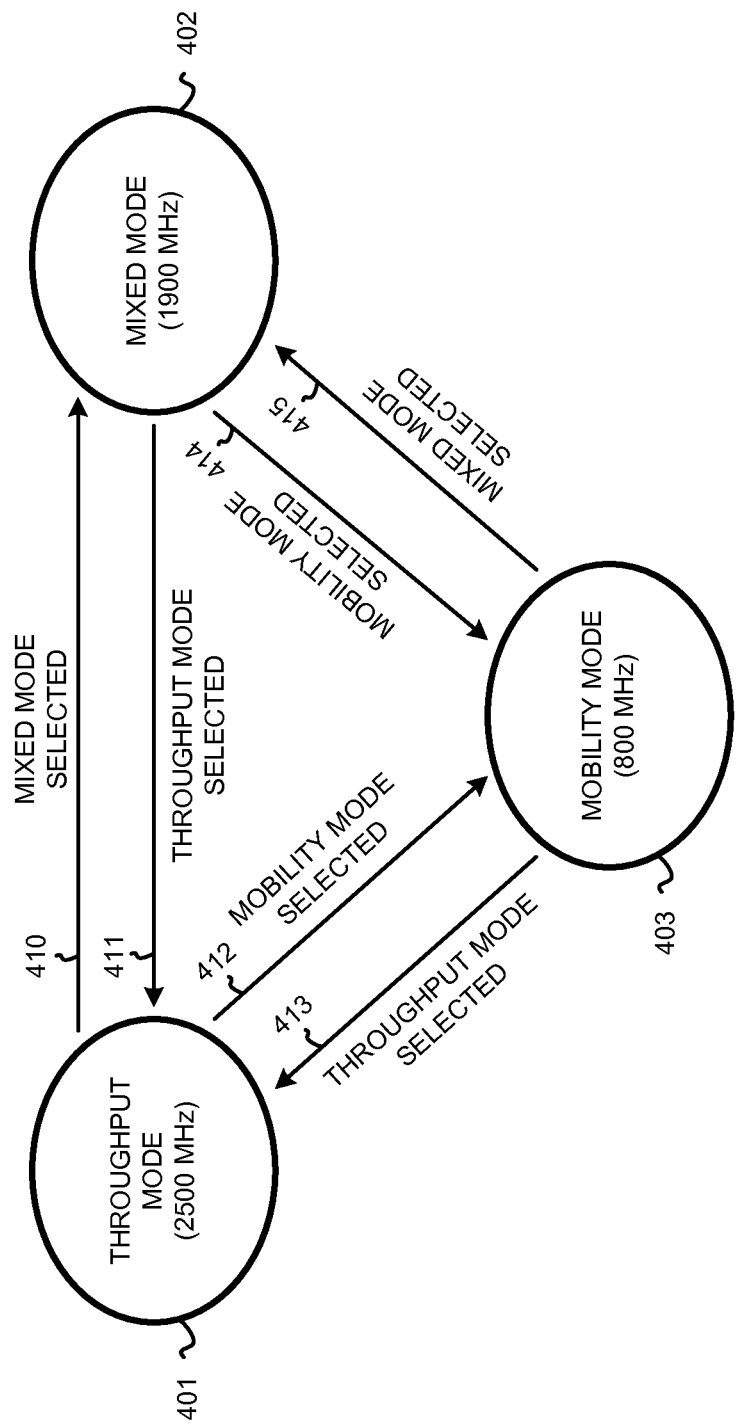
FIG. 4 is a state diagram illustrating a method of operation of a communication system.

Each wireless access node is indicated in FIG. 3 by a large black dot. Each black dot or wireless access node has at least one associated wireless coverage area. Wireless access nodes 330-347 each have one coverage area associated therewith, namely a 2500 MHz frequency band coverage area. Wireless access nodes 350-359 each have three coverage areas associated therewith, namely a 2500 MHz frequency band coverage area, a 1900 MHz frequency band coverage area, and an 800 MHz frequency band coverage area. Each coverage area can be associated with separate transceivers, antenna equipment, and structural supports, or can share equipment at each wireless access node. It should be understood that although specific frequency bands are indicated in FIGS. 3 and 4, that other frequency bands can be employed. However, the frequency bands typically comprise a high, middle, and low frequency band for throughput, mixed use, and mobility modes, respectively.

As indicated in the frequency legend at the bottom of FIG. 3, a first type of coverage area (namely the 2500 MHz coverage areas like coverage area 313) is associated with each wireless access node 330-347 and 350-359, and has the least amount of spatial extent of wireless coverage for each wireless access node. A second type of coverage area (namely the 1900 MHz coverage areas like coverage area 312) is associated with some of the wireless access nodes (350-359), and has a medium amount of spatial extent of wireless coverage for each associated wireless access node. A third type of coverage area (namely the 800 MHz coverage areas like coverage area 311) is associated with some of the wireless access nodes (350-359), and has the largest amount of spatial extent of wireless coverage for each associated wireless access node. Although circular coverage areas are shown in FIG. 3, it should be understood that these are merely representative of the various wireless coverage areas for each wireless access node. Also, the spatial extent of each wireless coverage area is typically inversely proportional to the frequency band over which it is provided.

In operation, smartphone 320 is initially at location L1 and moves to location L2 as indicated by the path drawn through communication system 300 in FIG. 3. Smartphone 320 receives wireless access to communication services while passing through the various wireless coverage areas crossed during movement from L1 to L2. During this movement, smartphone 320 engages in handoffs between the various wireless access nodes as appropriate.

FIG. 4 is a state diagram illustrating a method of operation of communication system 300. FIG. 4 includes three states 401-403, with state 401 corresponding to a throughput mode of operation, state 402 corresponding to a mixed use mode of operation, and state 403 corresponding to a mobility mode of operation. As discussed below, smartphone 320 can transition between each mode of operation based on various statuses or conditions, which can include mobility statuses or conditions such as discussed in FIGS. 1 and 2. These statuses or conditions can be based on mobility, throughput, mixed use conditions, data usage, user mode selections, time of day, location-based conditions, among other statuses or conditions, including combinations thereof.

For this example, smartphone 320 begins at location L1 in throughput mode 401 and receiving wireless access to communication services over the 2500 MHz frequency band. Due to movement of smartphone 320 which brings smartphone 320 to location L2, a number of handoffs occur between the various wireless access nodes and associated coverage areas. Smartphone 320 can monitor the quantity of handoffs during movement, and if the quantity of handoffs of smartphone 320 exceeds a predetermined handoff threshold within a predetermined time, then the mobility status of smartphone 320 can be determined to satisfy a mobility condition. Upon satisfying the mobility condition, smartphone 320 can enter mobility mode of operation 403 using state transition 412. The mobility mode can be selected by smartphone 320 based on the mobility status as discussed herein, or can be selected by a user of smartphone 320, such as through a user interface selection. Smartphone 320 indicates to the associated wireless network that a mobility condition is satisfied and the wireless network transitions smartphone 320 onto a mobility frequency band, namely 800 MHz in this example. As shown in FIG. 3, the coverage areas of the 800 MHz frequency bands for the wireless access nodes in FIG. 3 are larger than the wireless coverage areas of the 2500 MHz frequency bands. Thus, after smartphone 320 transitions to the 800 MHz mobility frequency band from the 2500 throughput frequency band, fewer handoffs will be required by smartphone 320. However, the bandwidth or throughput of a data communication session on the 800 MHz mobility is typically slower than the bandwidth or throughput of a data communication session on the 2500 MHz frequency band, and thus smartphone 320 might experience slower throughput in the mobility mode.

Once smartphone 320 reaches location L2, smartphone 320 might remain stationary or reduce a mobility status. If this mobility status drops below a mobility threshold, such as a number of mobility handoffs dropping below a handoff threshold, then smartphone 320 can transition from mobility mode 403 to throughput mode 401 through transition 413. Likewise, if a user of smartphone 320 selects a throughput mode via a user interface, then smartphone 320 can enter throughput mode 401. Smartphone 320 indicates to the associated wireless network that a mobility condition no longer satisfied and the wireless network transitions smartphone 320 onto a throughput frequency band, namely 2500 MHz in this example.

Instead of a mobility status driving the change in state from the mobility mode to the throughput mode, a throughput status of smartphone 320 can initiate the transition from mobility mode 403 to throughput mode 401. For example, when a throughput status of the wireless communication device satisfies a throughput condition, smartphone 320 can transition to throughput mode 401. The throughput status can satisfy the throughput condition when a data usage of smartphone 320 over a predetermined period of time while on the mobility frequency band exceeds a data usage threshold. Also, a user can select a throughput mode of operation for smartphone 320 based on a desire to achieve a higher data throughput on smartphone 320, such as to watch a video, download multimedia content, or other data usage.

In FIG. 4, a mixed usage mode or "mixed mode" 402 is shown. This mixed mode can be a transition state between throughput mode 401 and mobility mode 403. For example, when smartphone 320 satisfies the mobility condition mentioned above while in throughput mode 401, then instead of transitioning directly to mobility mode 403, smartphone 320 can transition into mixed mode 402. Mixed mode 402 operates at the 1900 MHz frequency band and provides a balance between mobility handoffs and throughput. If smartphone 320 remains satisfying the mobility condition for a period of time, then smartphone 320 can transition into mobility mode 403 Likewise, when smartphone 320 is in mobility mode 403 and desires a greater data throughput or drops below a mobility threshold, then instead of transitioning directly to throughput mode 401, smartphone 320 can transition to mixed mode 402. If the data usage, desired throughput, or low mobility condition continues for a predetermined period of time, then smartphone 320 can transition to throughput mode 401. In some examples, determining the mobility status satisfies a mixed-use condition comprising both mobility and throughput features includes when the mobility status satisfies a mobility condition and a throughput status of smartphone 320 satisfies a throughput condition. These various conditions are discussed herein.

Thus, smartphone 320 can transition between throughput mode 401 which provides shorter wireless range but higher bandwidth or throughput, mobility mode 403 which provides longer wireless range but less handoffs and less bandwidth or throughput, and mixed mode 402 which provides a balance between mobility mode 403 and throughput mode 401 features. These transitions are shown in state transitions 410-415 and can be driven by monitoring of the various conditions by smartphone 320, or can be driven by user mode selections through a user interface of smartphone 320.

As discussed briefly in FIGS. 1 and 2, the indication transferred to the wireless network can indicate a desired mode of operation of smartphone 320. This indication can include a mobility mode indication such as mobility indication 151 of FIG. 1. This indication can also include a throughput mode indication or a mixed use mode indication. The mode indication can indicate a bearer selection by smartphone 320. This bearer can correspond to a mobility bearer, throughput bearer, or mixed use bearer, and indicate to the wireless network that smartphone 320 desires to transition to receive wireless access using an associated mode of operation. In this example, smartphone 320 cannot directly select an operating frequency band, and instead must indicate a desired mode of operation to the wireless network. In some example wireless networks, such as LTE wireless networks, wireless communication devices cannot directly select a frequency band, but instead can select a bearer. Thus, the mode indication transferred to the wireless network can indicate a selected bearer that corresponds to the desired mode of operation. The bearer can be a dedicated bearer which provides a connection between smartphone 320 and elements of the wireless network, such as a packet gateway node (PDN gateway) of an LTE wireless network. Smartphone 320 can be provided with a list of bearers that are dedicated to a particular mode of operation, such as a first bearer dedicated to mobility mode 403, a second bearer dedicated to mixed mode 402, and a third bearer dedicated to throughput mode 401. Smartphone 320 can select among this predetermined list of bearers provided by the wireless network and cached by smartphone 320. The wireless network can maintain relationships between each designated bearer and a frequency band. Thus, the mobility frequency band of 800 MHz can correspond to the mobility bearer, the throughput frequency band of 2500 MHz can correspond to the throughput bearer, and the mixed use frequency band can correspond to the mixed use bearer. Once a bearer has been indicated to the wireless network by smartphone 320, such as to a network control node, the wireless network can transition smartphone 320 to the appropriate frequency band. This transition can occur via a handoff requested by the wireless network for smartphone 320, or an instruction by the wireless network to smartphone 320 to handoff to the appropriate bearer which is associated with a frequency band.

Figure 5:
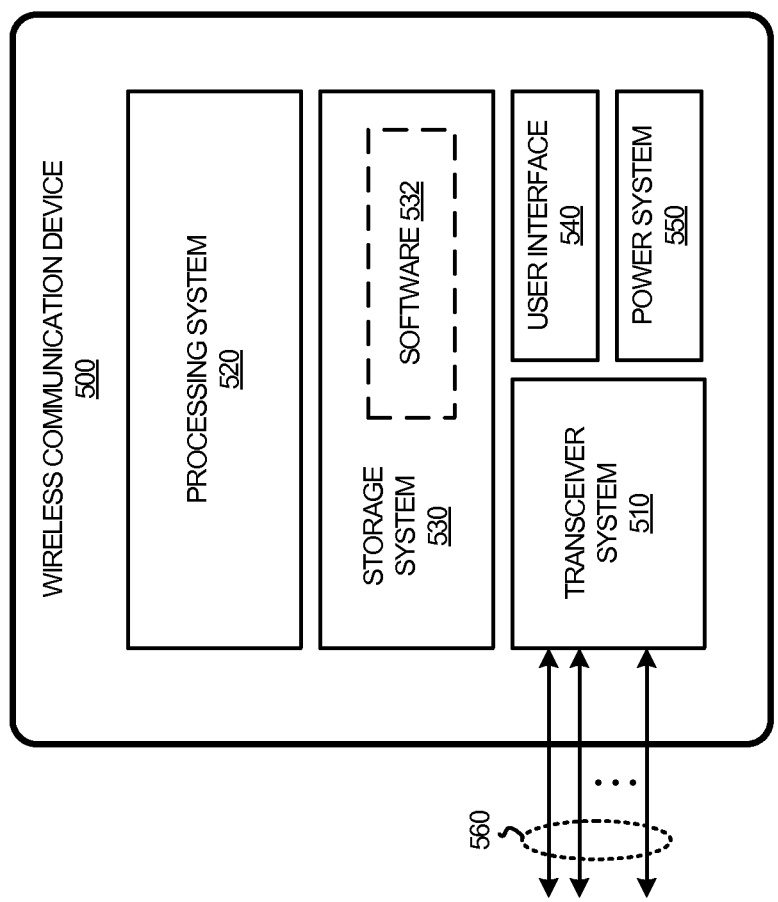
FIG. 5 is a block diagram illustrating a wireless communication device.

FIG. 5 is a block diagram illustrating wireless communication device 500, as an example of wireless communication device 110 found in FIG. 1 or mobile smartphone 320 found in FIG. 3, although variations are possible. Wireless communication device 500 includes transceiver system 510, processing system 520, storage system 530, user interface 540, and power system 550. Transceiver system 510, processing system 520, storage system 530, user interface system 540, and power system 550 are communicatively coupled, and can communicate over associated discrete links, common busses, data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Transceiver system 510 comprises one or more communication transceiver circuitry portions and communication interface circuitry for communicating over one or more communication links 560 with one or more communication networks. In some examples, transceiver system 510 includes wireless transceiver circuitry and antenna equipment for communicating with base stations of a cellular voice and data network, among other communication networks. Transceiver system 510 could include transceiver equipment and antenna elements for wirelessly exchanging user communications and overhead communications over the associated ones of links 560, among further links. Transceiver system 510 also receives command and control information and instructions from processing system 520 or user interface system 540 for controlling the operations of communications over links 560. Links 560 could each use various protocols or communication formats as described herein for links 140-141, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media or storage device readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to exchange wireless communications with a wireless network over a plurality of frequency bands, track mobility status to determine if the mobility status satisfies a mobility condition, transfer a mobility mode indication to a wireless network, and responsive to transitioning from a throughput frequency band to a mobility frequency band, exchange wireless communications with the wireless network over the mobility frequency band, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to exchange wireless communications with a wireless network over a plurality of frequency bands, track mobility status to determine if the mobility status satisfies a mobility condition, transfer a mobility mode indication to a wireless network, and responsive to transitioning from a throughput frequency band to a mobility frequency band, exchange wireless communications with the wireless network over the mobility frequency band.

In general, software 532 can, when loaded into processing system 520 and executed, transform processing system 520 overall from a general-purpose computing system into a special-purpose computing system customized to exchange wireless communications with a wireless network over a plurality of frequency bands, track mobility status to determine if the mobility status satisfies a mobility condition, transfer a mobility mode indication to a wireless network, and responsive to transitioning from a throughput frequency band to a mobility frequency band, exchange wireless communications with the wireless network over the mobility frequency band, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 550 includes circuitry and a power source to provide power to the elements of wireless communication device 500. The power source could include a battery, solar cell, flywheel, capacitor, thermoelectric generator, chemical power source, dynamo, or other power source. In some examples, power system 550 receives power from an external source, such as a wall outlet or power adapter. Power system 550 also includes circuitry to condition, monitor, and distribute electrical power to the elements of wireless communication device 500.

Figure 6:
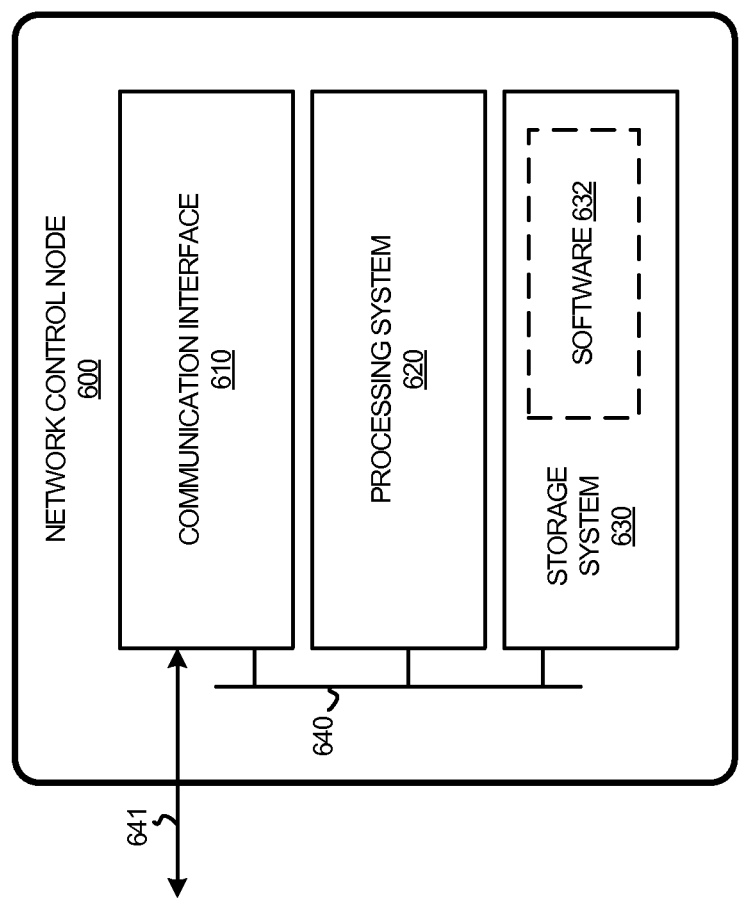
FIG. 6 is a block diagram illustrating a network control node.

FIG. 6 is a block diagram illustrating a detailed view of network control node 600. Network control node 600 can include equipment and systems as discussed herein for network control node 122 in FIG. 1, although variations are possible. Network control node 600 includes communication interface 610, processing system 620, and storage system 630. In operation, processing system 620 is operatively linked to communication interface 610 and storage system 630 by bus 640. It should be understood that discrete links can be employed, such as network links or other circuitry. Network control node 600 can be distributed or consolidated among equipment or circuitry that together forms the elements of network control node 600. Network control node 600 can optionally include additional devices, features, or functionality not discussed here for purposes of brevity.

Communication interface 610 includes a network interface for communicating over communication networks, such as wireless communication network 120 of FIG. 1. The network interface can include an Ethernet interface, or other local or wide area network communication interfaces which can communicate over a communication link. Examples of communication interface 610 include network interface card equipment, transceivers, modems, and other communication circuitry. In this example, communication interface 610 communicates over link 641. Link 641 can include any communication link as described herein, such as that described for link 143 in FIG. 1.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 632. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 can be implemented in program instructions and among other functions can, when executed by network control node 600 in general or processing system 620 in particular, direct network control node 600 or processing system 620 to provide command and control features for a wireless network having at least a mobility frequency band and a throughput frequency band, receive a mobility mode indication and transition a wireless communication device to a mobility frequency band from a throughput frequency band, among other operations. Software 632 can include additional processes, programs, or components, such as operating system software, database software, or application software. Software 632 can also comprise firmware or some other form of machine-readable processing instructions executable by processing system 620.

In at least one implementation, the program instructions can include first program instructions that direct processing system 620 to provide command and control features for a wireless network having at least a mobility frequency band and a throughput frequency band, receive a mobility mode indication and transition a wireless communication device to a mobility frequency band from a throughput frequency band, among other operations.

In general, software 632 can, when loaded into processing system 620 and executed, transform processing system 620 overall from a general-purpose computing system into a special-purpose computing system customized to provide command and control features for a wireless network having at least a mobility frequency band and a throughput frequency band, receive a mobility mode indication and transition a wireless communication device to a mobility frequency band from a throughput frequency band, among other operations. Encoding software 632 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Network control node 600 can also include other elements, such as user interfaces, computer systems, databases, distributed storage and processing elements, and the like. Network control node 600 can be included in the equipment or systems of wireless communication network 120 or wireless access node 121 of FIG. 1 or can be included in separate equipment or systems, including combinations thereof.

Referring back to FIG. 1, wireless communication device 110 comprises one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless access node 121 is associated with communication network 120, and provides wireless links 140-141 for wireless access to the communication services of communication network 120 within a geographic area. Wireless access node 121 comprises RF communication and control circuitry, transceivers, and antennas, as well as wireless communications equipment capable of communicating with and providing wireless access within a wireless coverage area to communication services for wireless communication devices, such as wireless communication device 110. The RF communication circuitry typically includes amplifiers, filters, RF modulators, transceivers, and signal processing circuitry. Wireless access node 110 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Wireless communication network 120 comprises communication and control systems for providing access to communication services for other devices and networks. Wireless communication network 120 can provide communication services including communication routing, link bridging, network communications, data exchange, or other communication services. In some examples, wireless communication network 120 is a cellular voice and data network that can provide voice calls, text messages, data access, or other communication services provided over cellular or wireless communication networks. In some examples, wireless communication network 120 includes equipment to provide wireless access to communication services within different coverage areas to user devices, route communications between content providers and user devices, and facilitate handoffs between equipment of different coverage areas, among other operations. Wireless communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Network control node 122 comprises computer processing systems and equipment. Network control node 122 can include communication or network interfaces, as well as computer systems, microprocessors, circuitry, cloud-based systems, or some other processing devices or software systems, and can be distributed among multiple processing devices. Examples of network control node 122 can also include software such as an operating system, logs, databases, utilities, drivers, networking software, and other software stored on a computer-readable medium.

Communication links 142-143 each use metal, glass, optical, air, space, or some other material as the transport media. Communication links 142-143 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 142-143 can each be a direct link or can include intermediate networks, systems, or devices, and can include a logical network link transported over multiple physical links. Communication links 142-143 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Communication links 140-141 each include one or more wireless links, and use the air or space as the transport media. Communication links 140-141 each comprise one or more wireless communication links provided over an associated wireless frequency spectrum or wireless frequency band, and can use various protocols. In this example, communication links 140-141 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-143 is shown in FIG. 1, it should be understood that links 140-143 are merely illustrative to show communication modes or access pathways. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system comprising a wireless network and a wireless communication device, the method comprising:
   in the wireless communication device, exchanging wireless communications with the wireless network over a throughput frequency band wherein the wireless network and the wireless communication device use the throughput frequency band when data throughput is prioritized over device mobility;
   in the wireless communication device, determining when geographic locations indicate that the wireless communication device is mobile on a road, and in response transferring a mobility mode indication to the wireless network;
   in the wireless network, receiving the mobility mode indication and transitioning the wireless communication device to a mobility frequency band from the throughput frequency band wherein the wireless network and the wireless communication device use the mobility frequency band when device mobility is prioritized over data throughput; and
   in the wireless communication device, responsive to transitioning from the throughput frequency band to the mobility frequency band, exchanging wireless communications with the wireless network over the mobility frequency band.

2. The method of claim 1, wherein the mobility frequency band comprises a lower frequency band than the throughput frequency band.

3. The method of claim 1, further comprising:
   in the wireless communication device, determining when geographic locations indicate that the wireless communication device is no longer mobile on the road, and in response, transferring a throughput mode indication to the wireless network;
   in the wireless network, receiving the throughput mode indication and transitioning the wireless communication device to the throughput frequency band from the mobility frequency band; and
   in the wireless communication device, responsive to transitioning from the mobility frequency band to the throughput frequency band, exchanging wireless communications with the wireless network over the throughput frequency band.

4. The method of claim 1, further comprising:
   in the wireless communication device, determining when device usage indicates that the wireless communication device has data requirements that satisfy a data throughput condition, and in response, transferring a throughput mode indication to the wireless network;
   in the wireless network, receiving the throughput mode indication and transitioning the wireless communication device to the throughput frequency band from the mobility frequency band; and
   in the wireless communication device, responsive to transitioning from the mobility frequency band to the throughput frequency band, exchanging wireless communications with the wireless network over the throughput frequency band.

5. A wireless communication system, comprising:
   at least one wireless communication device and a wireless network, wherein the wireless network and the wireless communication device use a mobility frequency band when device mobility is prioritized over data throughput and wherein the wireless network and the wireless communication device use a throughput frequency band when data throughput is prioritized over device mobility;

the wireless communication device configured to exchange wireless communications with the wireless network over the throughput frequency band, determine when geographic locations indicate that the wireless communication device is mobile on a road, and in response, transfer a mobility mode indication to the wireless network;

the wireless network configured to receive the mobility mode indication and transition the wireless communication device to the mobility frequency band from the throughput frequency band; and responsive to transitioning from the throughput frequency band to the mobility frequency band, the wireless communication device configured to exchange wireless communications with the wireless network over the mobility frequency band.

6. The wireless communication system of claim 5, wherein the mobility frequency band comprises a lower frequency band than the throughput frequency band.

7. The wireless communication system of claim 5, comprising:

in the wireless communication device configured to determine when geographic locations indicate that the wireless communication device is no longer mobile on the road, and in response, transfer a throughput mode indication to the wireless network;

the wireless network configured to receive the throughput mode indication and transition the wireless communication device to the throughput frequency band from the mobility frequency band; and responsive to transitioning from the mobility frequency band to the throughput frequency band, the wireless communication device configured to exchange wireless communications with the wireless network over the throughput frequency band.

8. The wireless communication system of claim 5, comprising:

the wireless communication device configured to determine when device usage indicates that the wireless communication device has data requirements that satisfy a data throughput condition, and in response, transfer a throughput mode indication to the wireless network;

the wireless network configured to receive the throughput mode indication and transition the wireless communication device to the throughput frequency band from the mobility frequency band; and responsive to transitioning from the mobility frequency band to the throughput frequency band, the wireless communication device configured to exchange wireless communications with the wireless network over the throughput frequency band.

\* \* \* \* \*